T. D. ROBINSON.
AEROPLANE.
APPLICATION FILED DEC. 26, 1911.
1,148,861.
Patented Aug. 3, 1915.
6 SHEETS—SHEET 3.
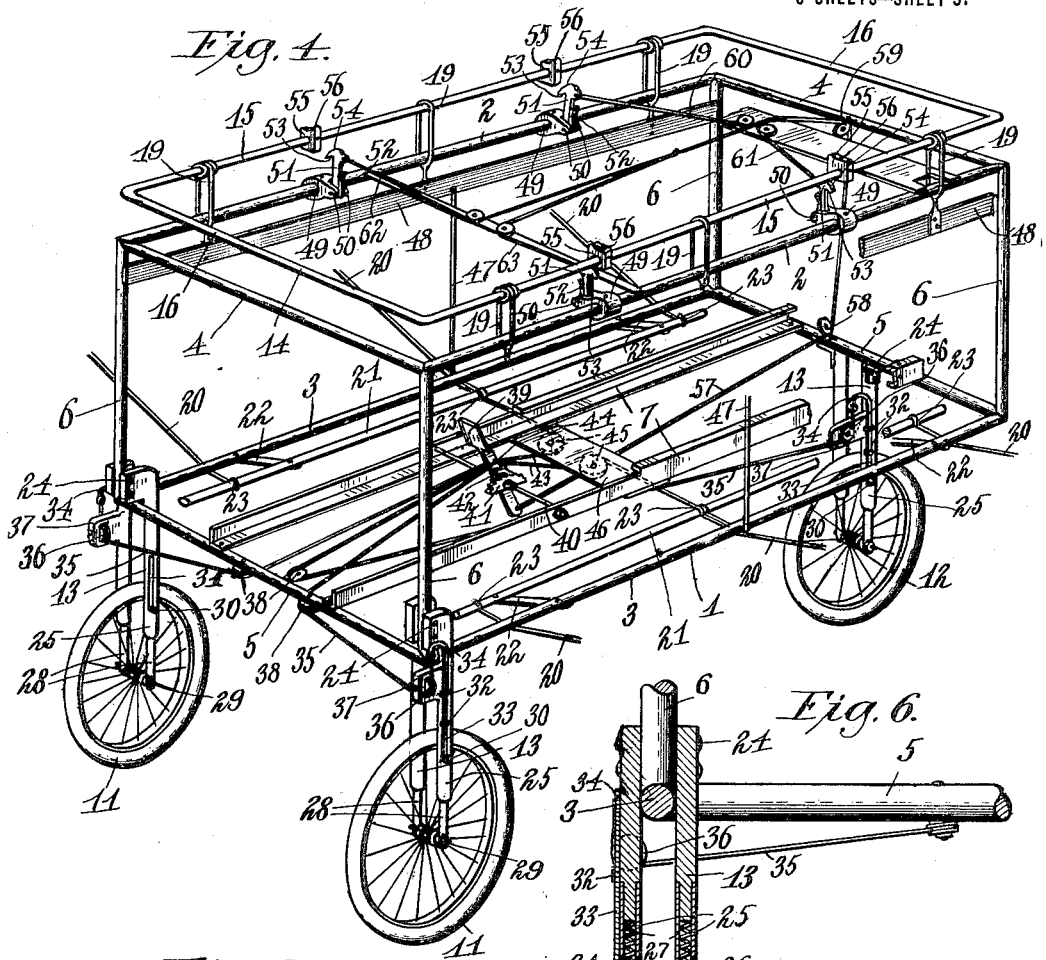
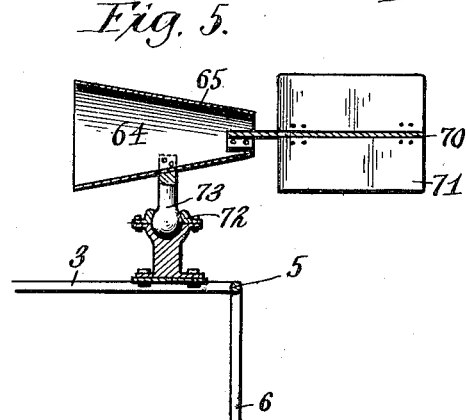
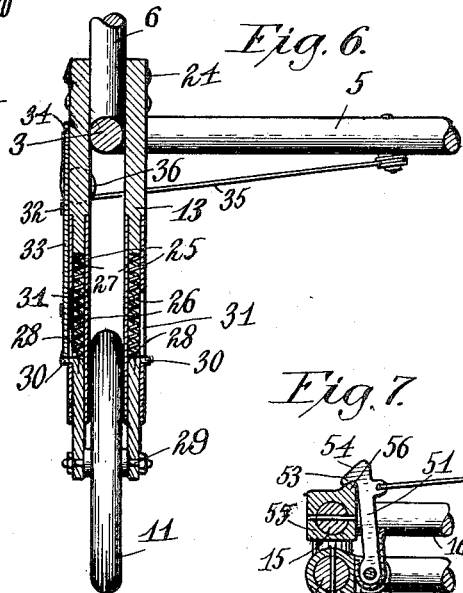
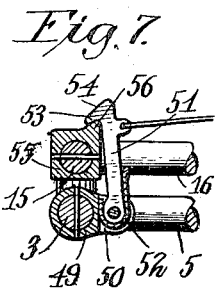
Witnesses:
Jacob Oberst, Jr.
Eda M. Schweiger
Theodore D. Robinson, Inventor,
By Emil Neuhard
Attorney.

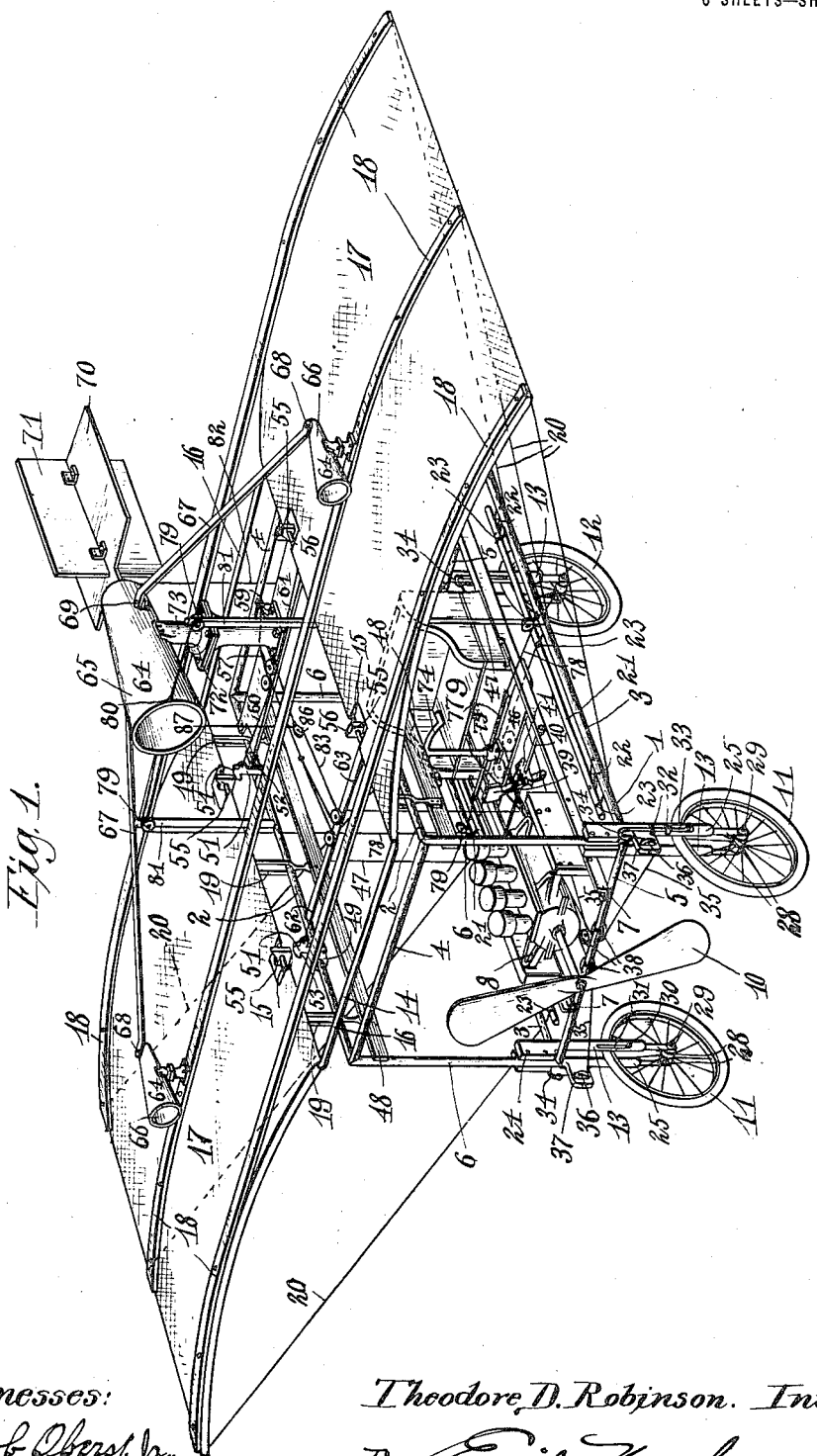

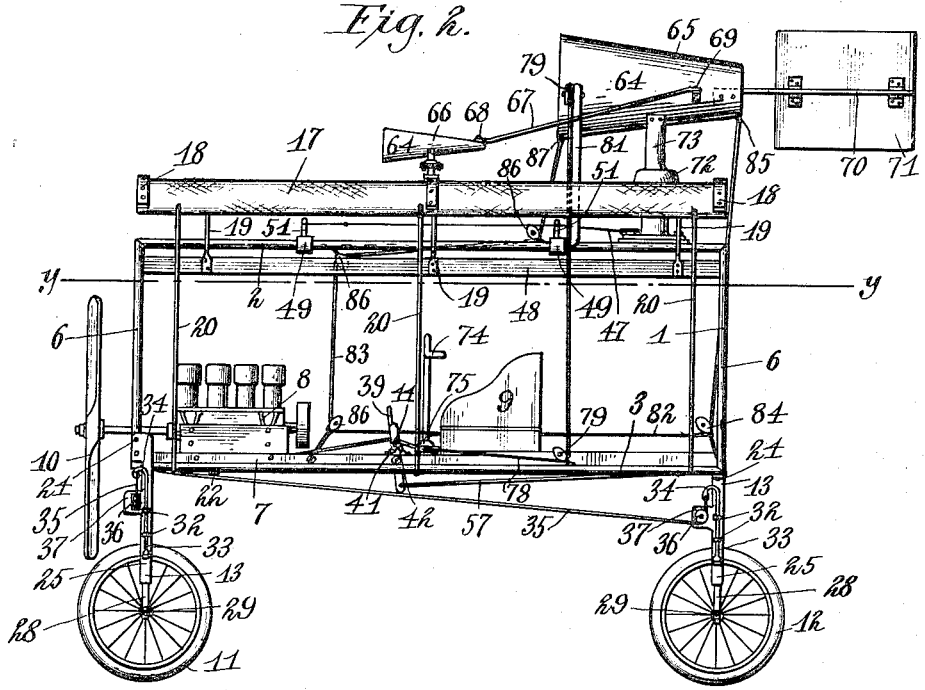

T. D. ROBINSON.
AEROPLANE.
APPLICATION FILED DEC. 26, 1911.

1,148,861.

Patented Aug. 3, 1915.
6 SHEETS—SHEET 4.

Witnesses:
Jacob Oberst, Jr.
Eda M. Schweiger

Theodore D. Robinson, Inventor.
By Emil Neuhardt
Attorney.

UNITED STATES PATENT OFFICE.

THEODORE D. ROBINSON, OF LOCKPORT, NEW YORK.

AEROPLANE.

1,148,861.  Specification of Letters Patent.  Patented Aug. 3, 1915.

Application filed December 26, 1911.  Serial No. 667,813.

*To all whom it may concern:*

Be it known that I, THEODORE D. ROBINSON, a citizen of the United States, residing at Lockport, in the county of Niagara and State of New York, have invented new and useful Improvements in Aeroplanes, of which the following is a specification.

My invention relates to aeroplanes, and has for its primary object to provide a machine so constructed that capsizing is avoided.

Other objects are to provide new and improved means for guiding the aeroplane in its course laterally and in respect to altitude; to arrange for changing the position of the operator so that his weight will assist in the raising or lowering of the craft; and to support the frame or chassis of the craft in such a manner as to act as a stabilizer.

Further objects are to so connect the planes with the frame or chassis that when in flight the latter may momentarily have a slight lateral swinging movement in the event of either plane being flexed or swung upward by strong currents of air so as to draw the other plane downward a corresponding degree, said frame or chassis, by reason of its loose connection, acting to resist the upward movement of said plane or planes and consequently keeping the craft balanced.

With these objects in view as briefly stated, my invention consists in the novel arrangement of devices, and in the novel features of construction and combination of parts to be hereinafter described and more particularly pointed out in the subjoined claims.

In machines of the type to which my invention relates and which are known as "heavier than air machines," the greatest difficulty is encountered in keeping the machine stabilized and this is particularly true when the power is cut-off and an attempt is made to land.

In the representative embodiment of my invention illustrated in the accompanying drawings, a machine is shown in which the disadvantages last referred to are eliminated and which is constructed with the above mentioned and other objects in view.

Figure 8:
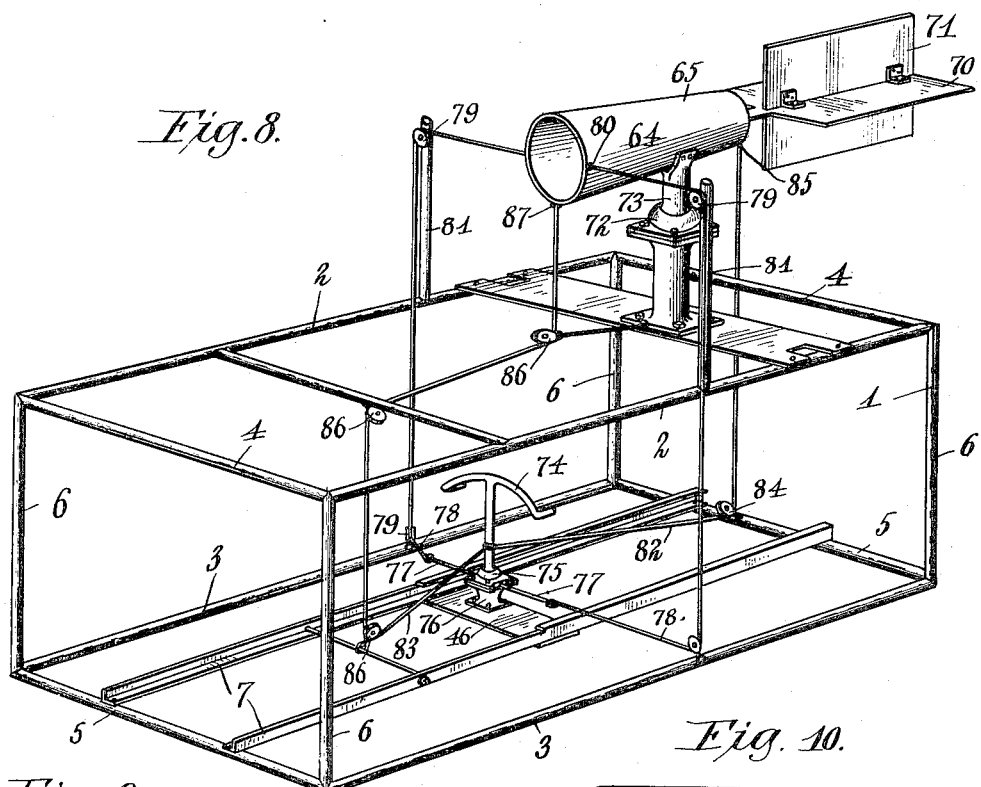
Figure 9:
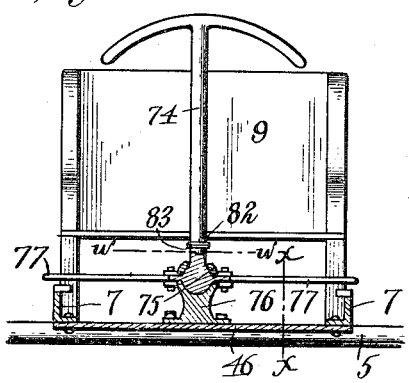
Figure 10:
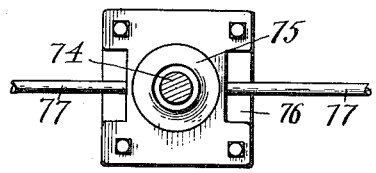
Figure 11:
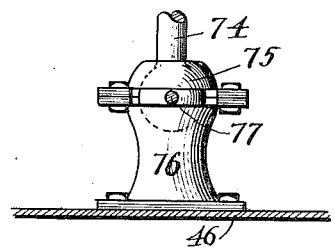
Figure 12:
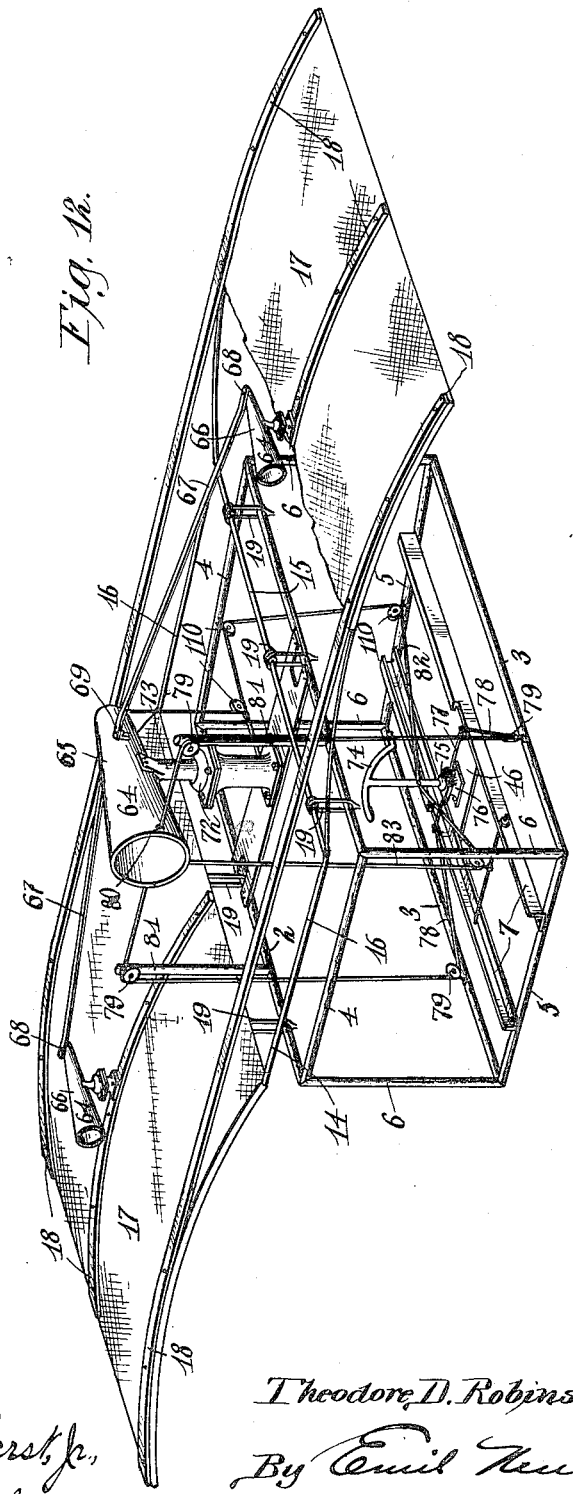
Figure 13:
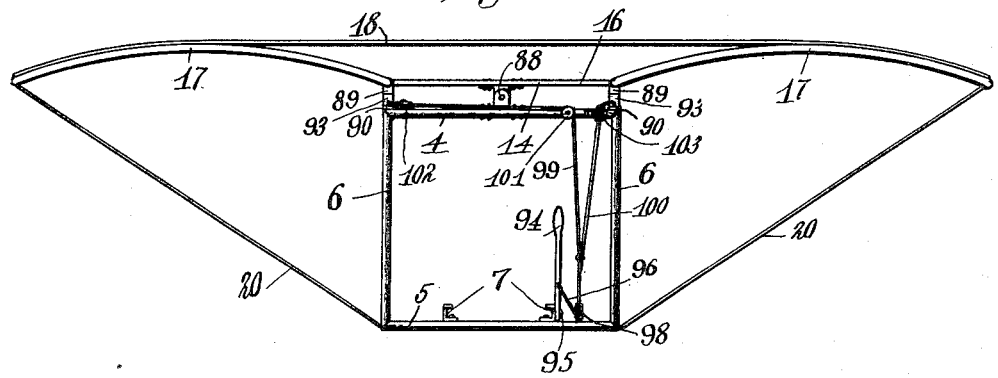
Figure 14:
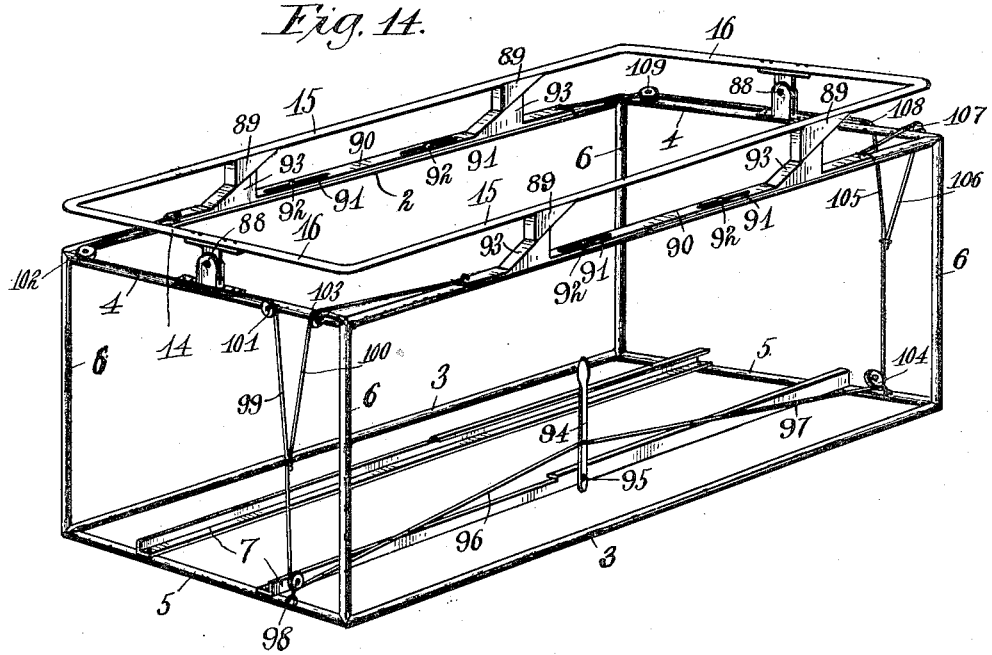

Figure 1 is a perspective view of the complete craft. Fig. 2 is a side elevation of the same. Fig. 3 is a horizontal section taken on line $y-y$, Fig. 2. Fig. 4 is a perspective view of the craft with the planes, the engine, and the operator's seat removed, parts being broken away to better illustrate other parts in rear. Fig. 5 is a central longitudinal section through the main steering device. Fig. 6 is a vertical section through one of the wheel supporting-frames or forks. Fig. 7 is a detail view of the locking mechanism for locking the plane-supporting frame to the chassis or main frame. Fig. 8 is a perspective view of the chassis or main frame and the steering mechanism. Fig. 9 is an enlarged transverse section taken on line $z-z$, Fig. 3. Fig. 10 is an enlarged horizontal section taken on line $w-w$, Fig. 9. Fig. 11 is an enlarged vertical section taken on line $x-x$, Fig. 9. Fig. 12 is a perspective view of the craft showing the main steering device in a different position on the frame or chassis. Fig. 13 is a front elevation of parts of a machine embodying certain features of my invention in modified form. Fig. 14 is a perspective view showing part of an aeroplane with said modifications.

Referring now to the drawings in detail, similar numerals of reference refer to similar parts in the several figures.

The reference numeral 1 designates the main-frame or chassis which is constructed of suitable light but strong material, such as bamboo or other material which will aid in reducing the weight of the craft to the minimum. This frame or chassis, which may broadly be considered a carrying member, comprises two pairs of longitudinal or side bars 2, 3, which are connected at their front and rear by cross bars 4, 5, respectively, the two pairs of longitudinal bars being connected by uprights 6. The frame thus formed is merely illustrative of one of the many forms it may be given, as that may be varied by the maker to suit his desires.

Extending from the lower front cross bar to the corresponding rear bar is a pair of spaced supporting bars 7 which serve to support the engine 8, the operator's seat 9, and other parts to be hereinafter described.

The craft is equipped with the usual propeller 10 which is preferably located in front of the frame or chassis and secured to the shaft of the engine or otherwise driven thereby.

The supporting bars 7 are preferably of a form in cross-section that will admit their use as tracks for the operator's seat to slide upon, said seat being arranged that it can be moved forward or back by the operator while otherwise operating the craft, the purpose of which is to bring the weight of the operator in any position within a certain range to assist in causing the craft to rise or lower in its travel. For the purpose of supporting the craft when stopped and also when starting the same as well as when making a landing, the frame or chassis is equipped with two forward wheels 11 and a rear wheel 12, suitable arms or forks 13 being provided which depend from the frame or chassis and straddle said wheels.

Above the main frame or chassis is a plane-supporting frame 14, which in the construction shown is rectangular in formation to correspond to the plan formation of the main frame or chassis, and it comprises side bars 15 and end bars 16. To the side bars 15 the inner ends of lifting or sustaining planes 17 are secured, these are shown slightly curved but may be flat or otherwise shaped and they are braced transversely by light but rigid cross strips 18 which extend from the outer edge of one plane to that of the other. These strips serve to stiffen the planes and prevent their swinging downward.

The main frame or chassis has connection with the plane-supporting frame in a manner that when the craft is sustained in the air by the planes, the main frame or chassis may have a slight swinging movement on the plane-supporting frame, and any suitable means of connection may be employed to admit of such action. I now consider the connection shown in Figs. 1, 2, 4 and 10 to lend itself admirably for this purpose. This connection comprises a series of loops or links 19 which surround the upper side bars 2 of the main frame or chassis and those of the plane-supporting frame.

When the craft is at rest, the plane-supporting frame with its planes and other parts supported thereon is in lowered position and rests upon the main frame or chassis, but when in flight, the main frame or chassis is suspended from the plane supporting-frame: such action being allowed by the loops 19 which are of sufficient length to hold the main frame or chassis spaced from the plane-supporting frame when the craft is in flight. These links, I term a "loose connection" which I employ generically to include pivotal connections or any other connection allowing lateral movement of the main frame or chassis relative to the plane-supporting frame.

In order to prevent upward swinging movement of the planes, independent of the main frame or chassis, guy wires 20 are connected to their outer ends and extend downward and inward therefrom for connection at any suitable points to the main frame or chassis, but preferably to compensating devices controlled automatically as well as manually to take up the slackness of the wires when the plane-supporting frame with its planes is lowered and rests upon the main frame or chassis, such being the case whenever the wheels 11, 12 are in contact with the ground. Said compensating devices are situated at or near the lower end of the chassis and therefore the guy-wires 20 may be said to be secured at their lower or inner ends to the lower ends of the chassis. The connection of said guy-wires to the chassis at points beneath the upper end of the latter is a vital feature of my invention and the attachment of said wires to the chassis at points beneath the center of gravity of said chassis, results in an entirely new operation, whereby the craft is at all times maintained in equilibrium.

The compensating devices are designed to be manually actuated directly the wheels leave the ground when starting on a flight and also just prior to the wheels striking the ground when making a landing; but in the event of the operator failing to manipulate the said devices, they will be brought into action automatically when the wheels come in contact with the ground, suitable means, to be hereinafter described being provided for such purpose. It is to be understood that these compensating devices can be arranged so that they are brought into action by manual manipulation only, in which case the automatically operated parts are dispensed with; or, the automatically operated parts can be used without the parts which require manual manipulation.

The compensating devices comprise a pair of bars 21 which are parallel with the lower side bars 3 of the main frame or chassis, one being arranged inside of and adjacent each of said side bars and having connection therewith by means of links 22 pivotally connected to both so that the bars 21, which may well be termed compensating bars, have parallel movements so that the extent of movement is exactly alike throughout their lengths.

I have previously referred to the guy-wires having their inner ends connected to suitable points of the main frame or chassis, and in a broad sense the said compensating bars are to be considered as part of the main frame or chassis. The inner ends of said guy-wires are secured to said compensating bars, as at 23, Figs. 1, 3 and 4, and when the plane-supporting frame rests upon the main frame or chassis, the compensating bars 21 are drawn inward, either manually or automatically, as the case may be, and draw the guy-wires taut, so that the planes are rigidly held and cannot readily flex or swing upon their supporting-frame. This is of decided advantage when making a landing, as otherwise the planes would be free to flap and if caught by a current of air would render the craft unmanageable.

The compensating devices are automatically manipulated from the wheels 11, 12, which are yieldingly mounted in their supporting arms or forks 13. Each fork comprising two spaced arms having their upper ends secured to the main frame or chassis, as at 24, and each arm has a tubular portion 25 in which is located an expansion spring 26 bearing with one end against a stop 27 and with its other end against the upper end of a bearing portion 28 slidable in said tubular portion and receiving one end of a wheel spindle 29. On these spindles the wheels 11, 12 are rotatably held and the bearing portions 28 have lateral extension 30 at their upper ends which extend through vertically-disposed slots 31 in said tubular portions and prevent the turning of said bearing portions therein so that the spindles 29 are held in parts limited to slight vertical movement, thus assuring the wheels freedom of action.

On one arm of each fork, guide loops 32 are arranged in which is guided for vertical movement, a rod 33, which normally bears with its lower end against the extension 30 projecting through the slot in said arm. These rods 33 are preferably recurved at their upper ends, as at 34, and each has one end of a manipulating cord or wire 35 attached thereto. Said manipulating wires, of which there is one for each wheel used, lead downward from their points of connection with said rods 33 and pass over sheaves 36 rotatably held on horizontal pintles arranged in extensions 37 on the arms to which said rods are held, thence around suitable direction-changing sheaves 38 and finally to a foot-lever 39 arranged in front of the operator's seat. Said foot-lever is pivotally secured at a point between its ends to a cross bar 40 fastened to the supporting-bars 7. On said cross bar 40 or otherwise suitably held is a toothed segment 41 with which a dog 42 on the foot-lever is adapted to co-act so that said lever may be retained in any position it may be placed. The connection of the manipulating wires 35 to the foot-lever is preferably at a point above its pivotal point so that when the weight of the craft is placed upon the supporting wheels, the said foot-lever is drawn forward and held in such position by the dog 42. Any suitable means for lifting the dog out of engagement with the toothed segment may be employed as these are common in the art.

When the supporting wheels come in contact with the ground, the slidable bearing parts or members 28 of the forks are forced upward into the tubular portions thereof. This causes the rods 33 to rise and draw upon the manipulating wires 35 to swing the foot-lever 39, which acts through the medium of wires 43 to manipulate the compensating bars 21. One end of each of the wires 43 is secured to the foot-lever 39 at a point above its pivotal point, as at 44, from whence they are directed rearward around direction-changing sheaves 45 secured to the underside of a foot-board 46 arranged for convenience of the operator, thence laterally in opposite directions to the two compensating bars, to which their opposite ends are secured. It is clear therefore, that when the weight of the craft is placed upon the supporting wheels, the plane-supporting frame with its planes is lowered and rests upon the main frame or chassis, causing the guy-wires 20 to slacken, and simultaneously the foot-lever 39 is drawn forward by the wires 35 connecting it with the wheel forks, causing it through the medium of the wires 43 to draw the compensating bars 21 inward. The guy-wires, by reason of their being connected to said compensating bars are therefore drawn taut in proportion and as quick as they slacken.

From the above description of the compensation mechanism, by which is meant the compensating devices and their manipulating means, it will be apparent that by operating the foot-lever manually, as by means of the operator's foot, the wires 43 will be drawn upon and the compensating bars 21 actuated, and at such times the manipulating wires 35 merely slacken without in any manner actuating the parts carried by the wheel forks. Manual operation in this manner is only desirable as far as now seen, when the operator, in his attempt to land, closely approaches the ground, as a much steadier and more safe landing can be made by drawing the plane-supporting frame with its planes down and tightening the guy-wires an instant before the wheels strike the ground, owing to the fact that when the compensating devices are manipulated automatically, there is a slight give to the planes while the guy-wires are being drawn taut, and while not sufficient to cause undesirable results, would not be as effective and steady as when manipulating manually.

For the purpose of manually drawing the plane-supporting frame and its plane downward, a wire 47 is secured to each compensating bar 21, from whence it is directed outward to pass around the adjacent lower side bar of the main frame or chassis, thence upward for connection with a longitudinally-disposed rod 48. These rods 48 have the loops 19 secured thereto, so that when the compensating bars 21 are drawn inward either manually or automatically, the lowering of the plane-supporting frame is assured.

I consider it of advantage to lock the plane-supporting frame in lowered position at certain times or under certain conditions and for this purpose I secure to each upper side bar of the main frame or chassis two or more sockets 49, each being provided with a pair of spaced ears 50. Between each pair of ears a lock dog 51 is pivotally secured and forced outward by a spring 52. The upper or free ends of the dogs have hooks 53 and inclined or rider edges 54, which, when the plane-supporting frame is drawn downward engage co-acting blocks 55 secured to the side bars of said plane-supporting frame, said blocks having ridges 56 at their upper inner marginal portion over which the hooks of the dogs 51 catch.

When making a landing after a flight, it is the intention to have the two frames of the craft lock together a moment before the supporting-wheels strike the ground, to accomplish which it will be necessary to manually draw down the plane-supporting frame which becomes locked automatically by the lock-dogs 51; but if the operator fails to so manipulate the craft, it will be done automatically as soon as the supporting wheels strike the ground, and in either event the two frames become locked when the locking mechanism for that purpose is used. The two frames remain locked until after another flight is started; when, as soon as the supporting wheels leave the ground the operator disengages the two frames and allows the main frame or chassis to be suspended from the plane-supporting frame.

The disengagement of the main frame from the plane-supporting frame is effected by the foot-lever 39 when it is released to allow the wires 47 to slacken. This is done by pulling the foot-lever backward, which causes the portion of the lever beneath its pivot to move forward and to this forwardly moving portion a wire or cable 57 is secured, from whence it is directed rearward and passes over direction-changing sheaves 58, 59, after passing which it is divided into branches 60, 61, 62, 63, each of which passes around a direction-changing sheave and leads to one of the lock-dogs 51, so that when drawing upon the wire or cable 57, the lock-dogs are caused to act simultaneously and thus release the main frame or chassis.

It will be understood, by suspending the main frame or chassis from the planes, or more particularly in the embodiment of my invention herein disclosed from the plane-supporting frame, that the tendency of air-currents striking the planes and capsizing the craft is effectively guarded against owing to the position of the main frame or chassis relative to said planes and particularly on account of the main frame or chassis having connection with the planes in a manner to allow limited lateral freedom in action, acting somewhat on the plan of a weight tending to at all times hang vertically and therefore keep the craft righted. In the event of a gust of wind striking one of the planes and tending to force one side of the craft up, the weight of the frame or chassis, which might momentarily be slightly drawn to one side, will immediately recover itself, and therefore resist such action. This return action of the main frame or chassis to its normal or vertical position draws down the momentarily raised plane and raises the other plane which was drawn down proportionately.

In the craft as illustrated and described the center of gravity is considerably beneath the planes and this in addition to the fact that the main frame or chassis has a swinging or otherwise loose connection with the planes so that it always tends to hang in a vertical plane, prevents capsizing, assures easy and positive control, and acts as a stabilizer.

The means for turning the craft, when in flight, to the right or left and also for raising and lowering the same, comprises one or more open-ended frusto-conical shells 64 at least one being mounted for universal movement. These steering or guiding shells or cones may be used with or without horizontal and vertical rudders, as may be desired. In Figs. 1, 2, 5 and 8, I have shown a main cone 65 mounted on the main frame or chassis toward the rear end thereof and auxiliary cones 66 mounted on the planes and being connected with the main cone by a rod 67 so that when said main cone is moved laterally in either direction the auxiliary cones will move in a corresponding direction and to the same degree. The rods 67 are pivotally connected, as at 68, 69; the connections 69 being to the main cone and being loose or otherwise arranged so that said main cone can also be swung in a vertical plane, at which time the auxiliary cones need not be similarly moved. Of course I consider it fully within the scope of my invention to move the auxiliary cones vertically with the main cone, but do not believe this necessary. To the rear or small end of the main cone 65 may be secured a horizontally disposed-rudder 70 and a vertically-disposed rudder 71 which will aid the cones in controlling the direction or altitude of the craft.

Each of the cones is mounted on a standard having a socket 72 at its upper end in which is fitted the substantially spherical lower end of depending rods 73 on the cones, thus permitting the cones to be moved in a vertical as well as horizontal plane, but by preference the connection between the cones is such that the auxiliary cones move only in horizontal planes.

Mounted on the foot-board 46 is a steering handle 74 having its lower end made substantially spherical to fit into a socket 75 at the upper end of a standard 76, and extending laterally from said spherical lower end in opposite directions are arms 77, the socket being cut away to allow said arms to project therethrough and also to allow them free movement within certain limits. To the outer ends of said arms are secured steering-wires 78 which are directed laterally and rearward and pass around direction-changing sheaves 78 fastened to the lower side bars of the main frame or chassis, or otherwise, from whence they are directed upward and around direction-changing sheaves 79, thence inward for connection with the main cone, as at 80. In order to draw the main cone laterally in a horizontal plane, the sheaves 79 are in line with the horizontal center of said cone and for this purpose the main frame or chassis has standards 81 rising therefrom to which the sheaves 79 are fastened. It will be understood from the above that when the steering handle is rotated the main cone will be swung laterally in a horizontal plane, the direction in which said cone is swung depending on the direction in which the handle is turned.

By reason of the steering handle being connected to its standard as described it may also be swung forward and back without changing the position of the arms 77. This forward and backward movement is utilized to swing the main cone in a vertical plane, to accomplish which, it has two wires 82, 83, secured thereto at a point above its connection to said standard. The wire 82 is directed rearwardly and passes around a direction-changing sheave 84 secured to the main frame or chassis and thence upward to the rear end of the main cone, to which it is secured, as at 85. The wire 83 is directed forwardly and passes around direction-changing sheaves 86 suitably secured and thence to the front end of the main cone, as at 87; this being best shown in Fig. 8. By placing the main cone in rear of the transverse center of the craft, the latter is caused to turn in a direction opposite that in which the cone is swung, and when regulating the height, the craft is caused to lower when the forward or large end of said cone is swung upward.

I consider it within the province of my invention to place the steering or controlling cones anywhere on the craft or in any relation, one to another. For this reason I have shown the cone in Fig. 12, positioned midway between the front and rear ends of the main frame or chassis and have shown the horizontal and vertical rudders omitted therefrom. In this position or any point in advance thereof, the craft is caused to travel in the same direction the cone is moved to.

In Figs. 13 and 14 I have shown the main frame or chassis suspended from the plane-supporting frame by means of central pivots 88, arranged in alinement. This also affords the swinging action desired, but when this form of connection is used, the two frames remain spaced apart and do not move one toward the other, except as they swing relatively. When the craft is so constructed, the side bars of the plane-supporting frame has depending wedges 89 secured thereto, and the upper side bars 2 have slide-bars 90 mounted thereon adapted to be drawn forward and rearward. Said slide bars have longitudinal slots 91 therein through which extend bolts 92 or other suitable retaining devices which are secured to said upper side bars. These slide bars have upwardly-directed wedges 93 which are adapted to co-act with the wedges 89. As shown in Figs. 13 and 14 said slide bars are manipulated by means of a lever 94 pivotally attached to the supporting bars 7, as at 95, and wires 96, 97. The wire 96 extends forward and passes around a direction-changing sheave 98, after passing which it is divided into two branches 99, 100; the branch 99 passing around direction-changing sheaves 101, 102, and the other around a direction-changing sheave 103, both branches being secured to the front ends of said slide bars. The wire 97 extends rearward and passes around a direction-changing sheave 104, after passing which it is divided into two branches 105, 106; one passing over a direction change sheave 107 and the other over direction-changing sheaves 108, 109, both being thence directed to the rear ends of the slide bars 90 to which they are attached. By moving the lever 94 forward, the slide bars are drawn rearward and the wedges 93 thereof disengage from the wedges 85; thus the main frame or chassis is free to swing laterally and retain its vertical position under all conditions to which the craft may be subjected.

When it is desired to lock the main frame or chassis against lateral movement, the lever 94 is drawn rearward, thus causing the slide bars 90 to be drawn forward so as to bring the wedges thereof in contact with those on the plane-supporting frame.

It is to be understood that changes in form, construction, and arrangement of parts may be resorted to without departing from my invention or sacrificing any advantages thereof, also that parts of my invention may be omitted and the remaining parts used alone or in connection with other parts.

Having thus described my invention, what I claim is,—

1. An aeroplane having a main frame or chassis, a plane or planes, and loops connecting the inner ends of said plane or planes with said frame to allow the latter slight swinging movement and also vertical movement independent of said swinging movement.

2. An aeroplane having a plane supporting frame, planes supported thereby and extending laterally therefrom in opposite directions, a main frame or chassis hung from said plane supporting frame in a manner to allow its swinging laterally and moving slightly vertically independent of said swinging movement, guy wires connecting said planes with said frame or chassis at a point below the upper end of the latter, and connecting members connecting said planes and extending transversely above said plane supporting frame.

3. In an aeroplane, steering mechanism comprising a central frusto-conical shell movable laterally in opposite directions and auxiliary frusto-conical shells at opposite sides thereof and connected therewith to operate in unison with said main shell.

4. In an aeroplane, steering mechanism comprising a standard, a conical shell open at opposite ends and universally connected with said standard, a second standard, an operating lever universally connected with said last-mentioned standard and having oppositely and laterally disposed arms extending centrally from the universal connection, flexible connection between said arms and said conical shell to move the latter laterally in opposite directions, and flexible connection between said lever at a point above its universal connection and said conical shell to move the latter vertically.

5. An aeroplane having a plane supporting frame, a plane or planes supported thereby, a main frame or chassis extending from said plane supporting frame so as to admit of its swinging laterally thereon and moving slightly vertically independent of said laterally swinging movement, and means connecting said main frame or chassis at points beneath its center of gravity with said plane or planes.

6. An aeroplane having a plane or planes, a main frame hung from said plane or planes and capable of slight swinging movement and also vertical movement independent of said swinging movement, and guy-wires connecting said main frame with said plane or planes, said guy-wires having connection with said frame at points beneath its center of gravity.

7. An aeroplane having a plane-supporting frame, a plane or planes carried thereby and extending laterally in opposite directions, a main frame or chassis suspended from said plane-supporting frame so that it may have a slight laterally swinging movement, guy-wires connecting the outer ends of said plane or planes with said frame or chassis, and compensating mechanism to draw said guy-wires taut when the aeroplane strikes or rests upon the ground and the plane-supporting frame with its plane or planes rests upon said frame or chassis.

8. An aeroplane comprising a main frame or chassis, a plane or planes above said frame or chassis, loops connecting said planes with said frame or chassis and serving as a means to suspend said frame or chassis from said plane or planes when in flight, guy-wires connected to said plane or planes, and compensating mechanism carried by said frame or chassis to which said guy-wires are also connected, said compensating mechanism being operative manually or automatically.

9. An aeroplane comprising a main frame or chassis, supporting wheels yieldingly secured to said frame or chassis, a plane or planes above said frame or chassis, a connection between plane or planes and said frame or chassis allowing the latter slight lateral swinging movement also movement of said frame or chassis and plane or planes relatively toward and from each other, guy-wires connected to said plane or planes, and compensating mechanism having connection with said guy-wires and actuated by the yielding movement of said supporting wheels.

10. An aeroplane comprising a main frame or chassis, supporting wheels yieldingly secured to said frame or chassis, an operating lever on said chassis, connection between said wheels and said lever whereby said lever is actuated when said wheels yield under weight or impact, a plane or planes above said frame and from which said frame is loosely hung when in flight, said plane or planes resting upon said frame when at rest, compensating bars carried by said frame, connection between said compensating bars and said operating lever, and guy-wires connecting said compensating bars with said plane or planes.

11. An aeroplane having a main frame or chassis, a plane or planes carried by said main frame or chassis when at rest, connectors connecting said plane or planes with said frame or chassis to suspend the latter from said plane or planes when in flight so that said frame or chassis may have slight lateral movement, and means to draw said plane or planes down onto said frame or chassis while in flight to hold the two rigidly together.

12. An aeroplane comprising a main frame or chassis, supporting wheels yieldingly secured to said frame or chassis, a plane or planes above said frame and from which said frame is loosely hung when in flight, and means interposed between said supporting wheels and said plane or planes whereby said plane or planes and said frame or chassis are rigidly locked together when said supporting wheels come in contact with the ground.

13. An aeroplane having a plane or planes, a carrying member suspended from said plane or planes and capable of slight swinging movement and also vertical movement independent of said swinging movement, and guy wires connecting said plane or planes with said carrying member at points beneath the center of gravity of the latter.

In testimony whereof, I have affixed my signature in the presence of two subscribing witnesses.

THEODORE D. ROBINSON.

Witnesses:
EMIL NEUHART,
ELIZABETH HEINTZ.

Copies of this patent may be obtained for five cents each, by addressing the "Commissioner of Patents, Washington, D. C."